United States Patent [19]

Anderson et al.

[11] 4,356,847

[45] Nov. 2, 1982

[54] REMOVABLE SEAL FOR ASH HOPPERS AND THE LIKE

[75] Inventors: Paul C. Anderson, Ottawa, Canada; Robert P. Sullivan, Chattanooga, Tenn.

[73] Assignee: Combustion Engineering, Inc., Windsor, Conn.

[21] Appl. No.: 230,917

[22] Filed: Feb. 2, 1981

[51] Int. Cl.³ .............................................. B65B 3/04
[52] U.S. Cl. ................................ 141/311 R; 110/177; 277/135
[58] Field of Search ................... 277/83, 135; 141/231, 141/232, 233, 287, 250–284, 311 R, 312, 367, 368, 383–392; 110/165, 171, 177

[56] References Cited

U.S. PATENT DOCUMENTS

| | | |
|---|---|---|
| 2,954,244 | 9/1960 | Austin .................................. 277/135 |
| 3,834,328 | 9/1974 | Blazewicz et al. ................. 110/177 |
| 4,269,125 | 5/1981 | Mellinger ............................ 110/177 |

Primary Examiner—Houston S. Bell, Jr.

[57] ABSTRACT

A removable seal for interconnecting passageways (10, 12) that move relative to each other. A liquid containing trough (28) is secured to one of the passageways, preferably the lower, and it has floated in it a curtain member (40) which moves in accordance with the level of liquid in the trough. This member (40) extends from the trough (28) and sealingly engages the other passageway when in an upper position but is spaced therefrom when in a lower position. This construction is especially suitable for sealing an ash hopper (12) to the lower end of a furnace (10).

11 Claims, 5 Drawing Figures

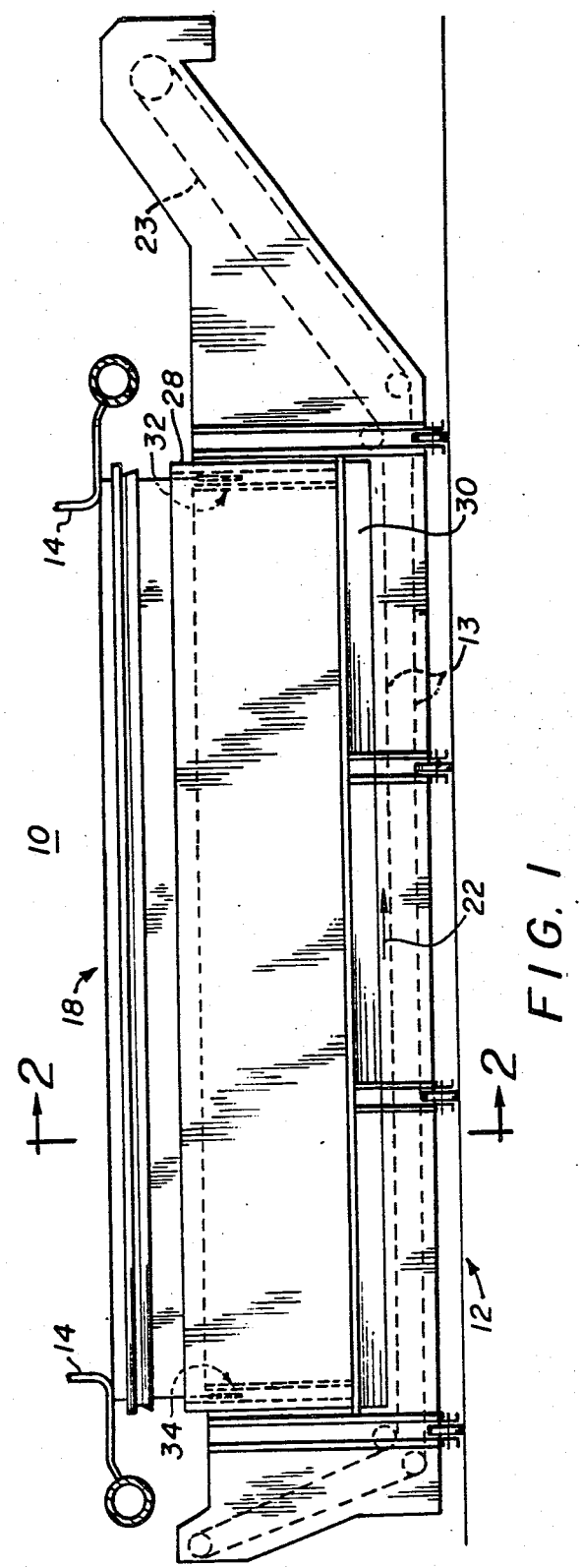

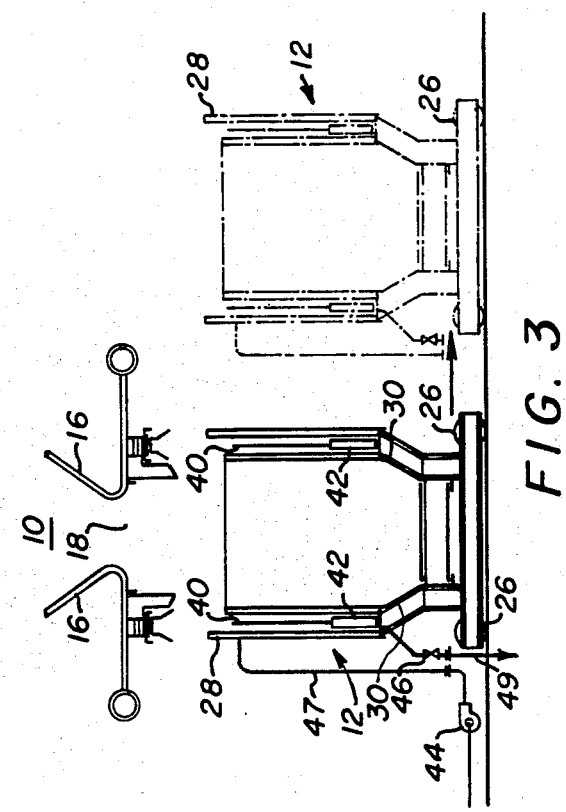

REMOVABLE SEAL FOR ASH HOPPERS AND THE LIKE

BACKGROUND OF THE INVENTION

The sealing of passageways, ducts and the like with a removable seal which permits the ducts upon removal of the seal to be moved laterally with respect to each other has proved to be a troublesome task in installations where during operation the passageways have a limited amount of differential movement. For instance, in the sealing of an ash hopper to the lower end of the furnace of a steam generator, it is necessary to provide an arrangement where a seal is maintained notwithstanding three dimensional movement of the furnace with respect to the ash hopper. As the furnace heats up upon initiating operation, the furnace extends downwardly and it expands laterally outward in all directions. In installations employing a continuous operating submerged scraper in the hopper, it is necessary that periodic maintenance be had with respect to the hopper mechanism. In order to provide suitable access for this maintenance, the hopper must be capable of moving laterally outward from beneath the steam generator. Thus, the seal must be removable as well as being capable of accommodating the differential movement caused by the thermal expansion of the furnace.

One conventional method of providing such a sealing arrangement for this type of ash hopper is to provide pivoted plates secured to the lower end of the steam generator. These plates extend in one position downward from the steam generator into the water contained within the ash hopper thus effecting a seal between the steam generator and the hopper. When it is desired to move the hopper laterally from beneath the steam generator, the plates are pivoted through a suitable motor operating mechanism to a horizontal position thus being withdrawn from the ash hopper. The hopper may then be moved to its lateral remote position. This is a relatively expensive and complicated sealing system which is not without its problems with respect to maintenance.

BRIEF DESCRIPTION OF THE INVENTION

The present invention is designed to provide a relatively economic and simple solution to the problem of sealingly interconnecting relatively movable passageways with a seal that is readily removable in order to permit lateral movement of one of the passageways with respect to the others. Referring specifically to a furnace ash hopper arrangement, there is provided with the invention a liquid containing trough that is connected to the ash hopper in a manner to provide a seal with respect to the hopper. The trough is of rectangular configuration and when the hopper is positioned beneath the furnace, it extends all the way around what may be termed a downward projection of the opening of the furnace. Positioned within this trough is a continuous curtain, the lower end of which is formed with a float. The curtain thus moves up and down as the liquid level in the trough moves up and down. The upper end of this curtain engages a suitable seal member that is connected to the lower end of the furnace in a fluid tight manner. This engagement of the upper end of the curtain and the sealing member effectively forms a seal. The curtain may be lowered from its position in engagement with the seal member by lowering the liquid level in the trough and it may therefore be moved to a lower position which permits lateral movement of the hopper with respect to the furnace.

BRIEF DESCRIPTION OF THE DRAWINGS

FIG. 1 is a side view partially in elevation showing the lower end of a furnace with a laterally movable ash hopper disposed beneath the furnace;

FIG. 2 is a sectional view taken generally along line 2—2 of FIG. 1;

FIG. 3 is a view similar to FIG. 2 except that the floating curtain is shown in its lower position;

DETAILED DESCRIPTION OF THE PREFERRED EMBODIMENT

Figure 4:
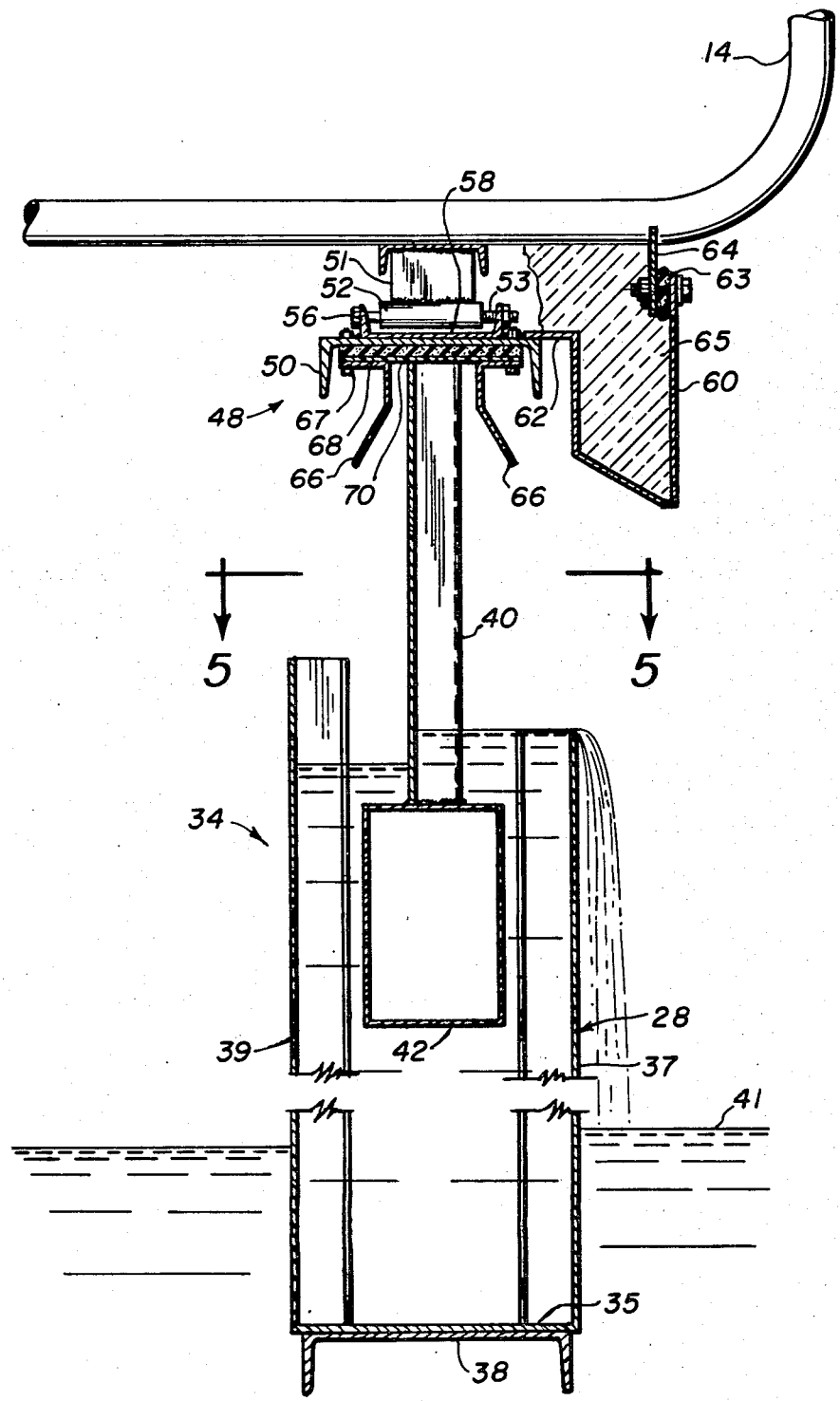
FIG. 4 is an enlarged detailed sectional view through one of the trough portions extending transversely of the hopper and showing the trough, curtain and seal assembly that is secured to the lower end of the furnace.

Referring now to the drawings wherein like reference characters are used throughout to designate like elements, there is depicted therein the lower portion of a furnace 10 of a steam generator beneath which is positioned a laterally movable ash hopper 12 of the type that employs a submerged scraper. The furnace includes end walls 14 and side walls 16 which form at the lower end of the furnace, a rectangular ash discharge opening 18 through which the ash descends into the ash hopper 12.

Positioned within hopper 12 is a continuously moving chain scraper 13 which is of conventional construction and disposed over suitable rollers with this scraper being motor driven so that the upper surface moves in the direction of arrow 22. The hopper which is formed of suitable wall members and a bottom is filled with water to a predetermined level during operation and the ash falls upon the upper run of the chain and is conveyed up the dewatering slope 23 from the upper end of which it is discharged in a known fashion. The ash hopper 12 is mounted on suitable wheels 26 so that it can be moved laterally out from beneath furnace 10 in order that repairs may be made to the hopper mechanism.

During operation of the furnace, it is necessary that the furnace be effectively connected with the ash hopper in a generally fluid-tight manner. The entrance of large quantities of air through the opening in the bottom of the furnace would cause inefficient operation and deleteriously affect the combustion of fuel taking place within the furnace.

In order to seal the hopper to the furnace, there is provided a trough 28 that is continuous and rectangular in horizontal section. The trough extends outside of the longitudinal extending sides 30 of the hopper and extends across the hopper as indicated at 32 and 34 so that with respect to a downward projection of the furnace ash discharge opening 18, the trough 28 extends completely around this projection and with this projection being located well within the confines of this trough. FIG. 4 is a vertical section through the trough portion 34 that extends across the hopper. As seen in this section, the trough is made up of a bottom member 35 and vertical wall members. The trough portions extending outside the longitudinal sides of the hopper include the outer side wall 39 while the inner side wall is the upper portion of the wall 30 of the hopper. The trough portions at 32 and 34 include the inner side wall 37 and outer side wall 39. In normal operation, the hopper is filled with water to a predetermined level as hereinbefore mentioned and this level extends above the bottom of the trough portions 32 and 34 extending across the hopper so that these portions are effectively sealed with respect to the hopper. In FIG. 4, this water level in the hopper is identified as 41. In order to provide rigidity to the walls of the trough, T-shaped stiffener members 43 are secured to these walls. These also act as guide members as hereinafter mentioned. Likewise, to provide rigidity to the hopper, stiffener members 45 are secured to the hopper walls.

Figure 5:
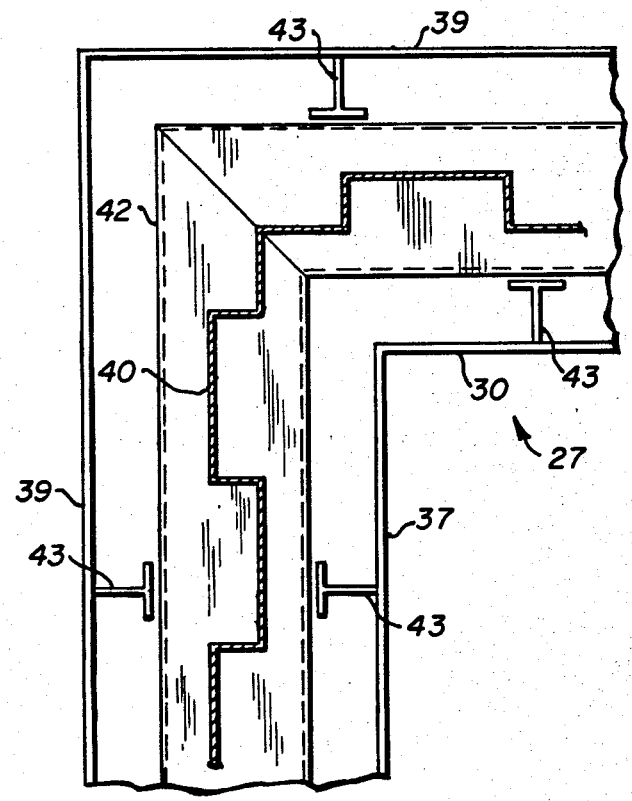
FIG. 5 is a view looking down on a corner of the trough (taken generally along line 5—5 of FIG. 4) showing the curtain positioned in the trough.

Disposed within the trough is a curtain 40 which effectively continuously extends about the downward projection of the ash discharge opening 18 and is preferably fabricated of sheet metal. This curtain is of corrugated configuration as shown in FIG. 5 and it has formed, at its bottom region, float 42 which preferably extends all the way around the trough. The arrangement is such that the curtain thus will float on the liquid (normally water) in the trough and the level of this liquid can be controlled by manipulation of the liquid supply system including pump 44 and supply pipe or hose 47 and the discharge system including valve 46 and discharge pipe or hose 49. The inner extremities of members 43 guide the movement of float 42.

Positioned above and cooperating with the upper end of the curtain 40 when the ash hopper is located beneath the furnace, is the seal assembly 48. This assembly 48 includes the channel 50 that extends all the way around the discharge opening 18 and is mounted on the lower end of the furnace in a manner to permit relative movement between this channel and the furnace in all lateral directions within predetermined limits. This is achieved by means of the so-called stirrup mounting that includes the spaced lugs 51 secured to the tubes at the bottom of the furnace. A furrel 52 is secured to the lower end of lug 51 and extending through this furrel is a suitable bolt 53 which projects through laterally elongated slots (not shown) formed in the upstanding ends 56 of the bracket 58. This bracket is secured to the top of the channel 50 as by welding. This connection thus permits the channel to move longitudinally and laterally with respect to the bottom of the furnace. It will be appreciated that this is necessary since as the furnace heats up upon initiating operation, it will expand in these directions with respect to this channel.

It is necessary that the channel 50 be connected in a fluid-tight manner with the furnace bottom and for this purpose there is provided the seal plate or member 60 which is generally of U-shaped construction having one of its edges welded to the channel at 62 and the other edge secured to a scalloped bar 64 by a bolted and sealed connection. This scalloped bar is in turn welded in a fluid-tight manner to the tubes of the steam generator.

It is desired to maintain the channel 50 at as low a temperature as possible and for this reason the space above the channel and the space within the seal member 60 is provided with a suitable thermal insulating material 65.

In order to guide the upper end of the curtain-type seal member 40, there are provided the spaced and outwardly flared guide members 66. These are secured to the channel by means of suitable bolts 67 and they are effective to hold in place a sheet of sponge rubber or the like 68 and a sheet of sealing material 70. This latter may be a plastic material which will form a seal with the upper edge of the curtain 48. The rubber and plastic effectively form a resilient sealing pad that extends throughout the overlying downwardly directed surface of the channel 50 and accommodates any irregularities in the upper edge of curtain 40 in order to form a seal therewith.

In the FIG. 4 illustration the water level on each side of the curtain 40 is shown displaced somewhat to indicate a slight negative pressure in the ash hopper that prevails with a furnace operating with what is termed balanced draft. A similar differential in the water level is of course had on opposite sides of the trough portions extending transversely of the hopper.

In operation, a seal is effected between the hopper 12 and the furnace 10 when the hopper is disposed beneath the furnace. In order to accomplish this result, water is admitted into the trough 28 so that the curtain 40 which floats on the surface of this water is moved to its uppermost position with the upper edge in engagement with the seal assembly 48 to form a substantially fluid-tight seal. Water is preferably continuously admitted to the trough 28 so as to fill the trough and overflow into the ash hopper 12. For this purpose, the inner wall of the trough is lower than the outer wall. By thus filling the trough and sinking the float portion 42, an adequate force is created to press the curtain 40 against the seal assembly 48 to provide a seal with this force being equal to the weight of the water displaced minus the weight of the curtain. The overflow from the trough can provide some of the makeup water that is necessary for the ash hopper due to evaporation and entrainment of water with the ash removed from the hopper. It will also serve to cool the trough with the cooling effect allowing flexibility in the ash hopper water level. This is desirable since with some types of ash a relatively low ash hopper water level is desired in order to reduce the possibility of water explosions. It will be understood that the level of fluid in the ash hopper is regulated in a conventional manner.

When it is desired to release the seal between the ash hopper and the lower end of the furnace, sufficient water is drained from the trough 28 to lower the curtain 40 to such a position that the hopper may be moved laterally on its wheels 26 from a position beneath the furnace to a laterally displaced position to permit maintenance of the hopper mechanism. This position of the curtain is illustrated in FIG. 3 with the dotted line position showing the hopper in its laterally displaced position.

The curtain is accordingly actuatable in the simple fashion of supplying and removing water to and from the trough 28. There is thus provided a simple and economic arrangement for sealingly connecting the hopper to the bottom of the furnace when desired and releasing this connection to permit lateral displacement of these members when this becomes necessary.

We claim:

1. In combination with an ash producing means and an ash receiving means disposed therebelow, a seal arrangement for sealingly connecting said means and said arrangement including an endless trough disposed about and sealed to one of said means and adapted to contain a liquid, a seal curtain assembly extending from the trough toward said other means and including a float in said trough operative to move the assembly into and out of sealing relation with said other means in accordance with the liquid level in the trough, and means to regulate the liquid level in the trough.

2. The seal arrangement of claim 1 wherein the trough is attached to the lower passageway.

3. The seal arrangement of claims 1 or 2 wherein the seal curtain assembly includes a corrugated sheet member extending from the float, the end of this member removably engaging said other passageway, with means forming a generally fluid-tight juncture between said end and said other passageway.

4. In combination with an ash producing facility having a downwardly directed ash opening in the lower region thereof, an ash receiving means below said opening and laterally movable with respect thereto, and means providing a removable seal between said facility and said receiving means the improvement wherein said seal means comprises a liquid retaining trough carried by said ash receiving means and disposed about a downward projection of said opening, and a floatable seal curtain disposed in said trough and movably in accordance with the liquid level therein to and from a position sealingly engaging said facility and a position spaced therefrom, and means to control the liquid level in the trough.

5. The combination of claim 4 wherein the seal curtain comprises an upstanding corrugated metallic member.

6. The combination of claim 5 wherein the seal between said metallic member and said facility is facilitated by a seal means mounted on one of these elements and which includes a resilient member to accommodate irregularities therebetween.

7. The combination of claim 5 wherein a resilient seal means is mounted on said facility for engagement by the upper end of said corrugated metallic member.

8. The combination of claim 7 wherein the ash receiving means includes an elongated ash hopper adapted to be filled with liquid to a predetermined level, the trough having a portion extending along the sides of said hopper, and a portion across the hopper inwardly of the ends thereof, the latter portion extending below said predetermined level.

9. The combination of any of claims 4, 5 or 8 wherein the trough has one wall higher than the other such that the liquid overflow therefrom is into said ash receiving means.

10. An ash producing facility having a bottom ash opening, a submerged scraper type, laterally movable ash hopper beneath said opening adapted to be filled with water to a predetermined level, and means providing a removable substantially gas-tight seal between the furnace and the hopper, said seal means including an endless trough mounted on said hopper and sealed with relation thereto, said trough extending around a downward projection of said ash opening, an endless float positioned in and extending throughout said trough, a corrugated sheet member extending up from said float throughout the extent thereof engaging the furnace bottom when in an upper position and spaced therefrom when in a lower position, resilient means providing a general fluid-tight seal between said sheet member and said furnace bottom when the former is in its upper position, and means for controlling the admission and discharge of water to said trough to control the position of said metallic member by said float.

11. The organization of claim 10 wherein the trough is so constructed and arranged that the water overflow therefrom is into the hopper whereby the trough may be continuously filled to overflowing while the furnace is in operation.

* * * * *